(12) United States Patent
Stahl et al.

(10) Patent No.: US 7,362,381 B1
(45) Date of Patent: Apr. 22, 2008

(54) DEVICE INTEROPERABILITY UTILIZING BIT-MAPPED ON-SCREEN DISPLAY MENUS

(75) Inventors: Thomas Anthony Stahl, Indianapolis, IN (US); Amit Kumar Chatterjee, North Andover, MA (US); Izzat Hekmat Izzat, Carmel, IN (US); Saban Kurugay, Waukesha, WI (US); Sanjeev Nagpal, Longmont, CO (US); Robert Eugene Trzybinski, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/555,188

(22) PCT Filed: Nov. 20, 1998

(86) PCT No.: PCT/US98/24687

§ 371 (c)(1),
(2), (4) Date: Sep. 13, 2000

(87) PCT Pub. No.: WO99/27710

PCT Pub. Date: Jun. 3, 1999

(51) Int. Cl.
*H04N 5/50* (2006.01)
*H04N 5/91* (2006.01)
(52) U.S. Cl. ..................... 348/569; 348/706
(58) Field of Classification Search ............... 348/569, 348/564, 705, 706, 441, 563, 553, 552; 725/80; 386/83; 710/8, 10, 14, 33, 62, 73, 305, 306, 710/313; 345/629; 715/719
See application file for complete search history.

(56) References Cited

U.S. PATENT DOCUMENTS

| 5,229,758 | A | | 7/1993 | Hsu |
| 5,239,388 | A | | 8/1993 | Matsumoto |
| 5,335,323 | A | * | 8/1994 | Kolnick ..................... 395/164 |
| 5,377,016 | A | | 12/1994 | Kashiwagi et al. |
| 5,499,018 | A | | 3/1996 | Welmer |
| 5,534,942 | A | * | 7/1996 | Beyers et al. ............... 348/569 |
| 5,608,425 | A | * | 3/1997 | Movshovich ............... 345/467 |
| 5,608,730 | A | | 3/1997 | Osakabe et al. |
| 5,617,330 | A | | 4/1997 | Stirling |
| 5,617,571 | A | | 4/1997 | Tanaka |
| 5,646,749 | A | | 7/1997 | Omi et al. |
| 5,760,842 | A | * | 6/1998 | Song .......................... 348/564 |

(Continued)

FOREIGN PATENT DOCUMENTS

EP 840277 A2 * 5/1998

(Continued)

OTHER PUBLICATIONS

European Search Report dated Mar. 25, 1999.

*Primary Examiner*—Victor R. Kostak
(74) *Attorney, Agent, or Firm*—Joseph J. Laks; Robert B. Levy; Catherine A. Ferguson (57) ABSTRACT

Interoperability for exchanging on-screen display menus and associated control between common consumer electronic (CE) devices is provided. This interoperability is based on the IEEE 1394 serial bus for the physical and link layers and makes use of AV/C or CAL as the control language. This invention provides for transferring a bit-mapped on-screen display menu constructed by a target device (e.g., digital VCR) to display device (e.g., digital TV).

10 Claims, 6 Drawing Sheets

U.S. PATENT DOCUMENTS

| | | | |
|---|---|---|---|
| 5,809,538 A * | 9/1998 | Pollmann et al. | 711/151 |
| 5,883,621 A * | 3/1999 | Iwamura | 725/37 |
| 5,991,520 A * | 11/1999 | Smyers et al. | 710/100 |
| 6,012,112 A * | 1/2000 | Brase et al. | 710/62 |
| 6,072,462 A * | 6/2000 | Movshovich | 345/467 |
| 6,137,539 A * | 10/2000 | Lownes et al. | 348/569 |
| 6,259,487 B1 * | 7/2001 | Bril | 348/553 |
| 6,415,098 B1 * | 7/2002 | Taira | 386/70 |
| 6,519,009 B1 * | 2/2003 | Hanaya et al. | 348/564 |
| 6,525,775 B1 * | 2/2003 | Kahn et al. | 348/460 |
| 6,556,221 B1 * | 4/2003 | Shima et al. | 715/764 |
| 2004/0268392 A1 * | 12/2004 | Tanaka | 725/42 |

FOREIGN PATENT DOCUMENTS

| | | |
|---|---|---|
| EP | 0840512 | 5/1998 |
| EP | 0873009 | 10/1998 |
| WO | 97/05743 | 2/1997 |

* cited by examiner

DEVICE INTEROPERABILITY UTILIZING BIT-MAPPED ON-SCREEN DISPLAY MENUS

FIELD OF THE INVENTION

The invention involves a system for controlling multiple electronic devices, such as consumer electronic devices or the like, via interconnections such as digital data buses. More particularly, this invention concerns an arrangement for managing the interoperability of the On-Screen Display menus of such devices.

BACKGROUND OF THE INVENTION

A data bus can be utilized for interconnecting digital electronic devices such as television receivers, display devices, video-cassette recorders (VCR), direct broadcast satellite (DBS) receivers, and home control devices (e.g., a security system or a temperature control device). Communication using a data bus occurs in accordance with a bus protocol. Examples of bus protocols include the Consumer Electronics Bus (CEBus) and the IEEE 1394 High Performance Serial Bus.

A bus protocol typically provides for communicating both control information and data. For example, CEBus control information is communicated on a "control channel" having a protocol defined in Electronics Industries Association (EIA) specification IS-60. On an IEEE 1394 serial bus, control information is generally passed using the asynchronous services of the serial bus. Control information for a particular application can be defined using for example, Common Application Language (CAL) or AV/C.

Figure 1:
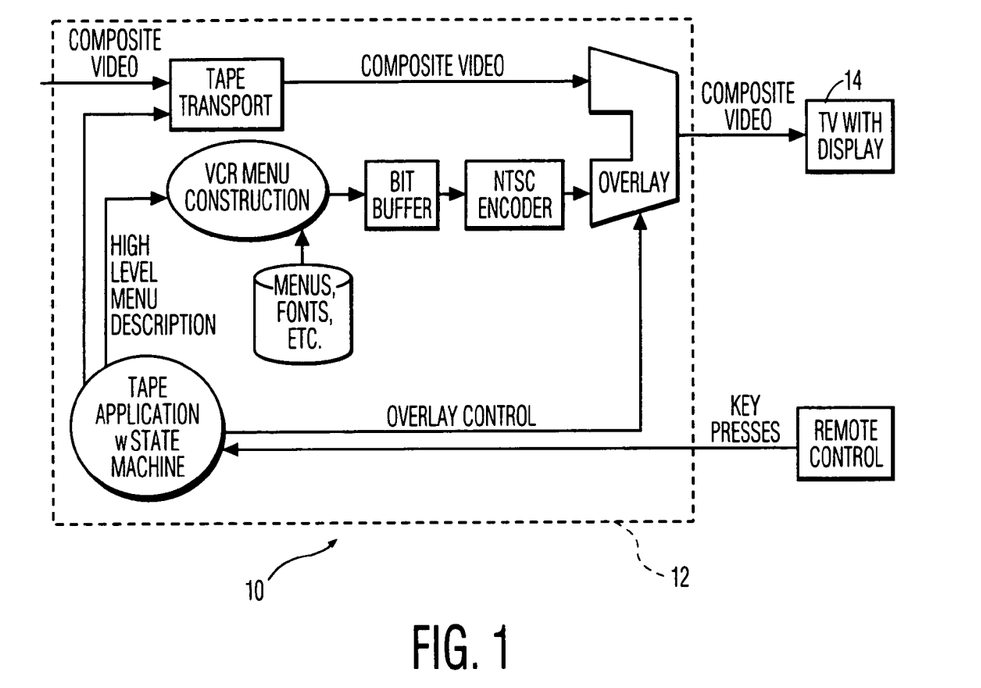
FIG. 1 shows, in simplified block-diagram form, the interoperability of a prior art audio/video system.

In today's analog audio/video (A/V) cluster, controlling peripheral devices may include, but do not require, the activation of an On-Screen Display (OSD) mechanism on a display device (i.e., TV). The OSD of such A/V devices is generated in the peripheral or target device (e.g., VCR) and is output on the NTSC output of such devices the same way as any other video signal. Thus, no additional hardware or software is needed in either the peripheral or the display device. FIG. 1 illustrates a present A/V system 10 having a VCR 12 and a display device 14 (e.g., television) that employs such a control methodology. Menus associated with controlling VCR 12 are generated by the VCR 12 and are provided to the display device 14 via the NTSC output of the VCR 12 as a composite video signal.

SUMMARY OF THE INVENTION

Figure 2:
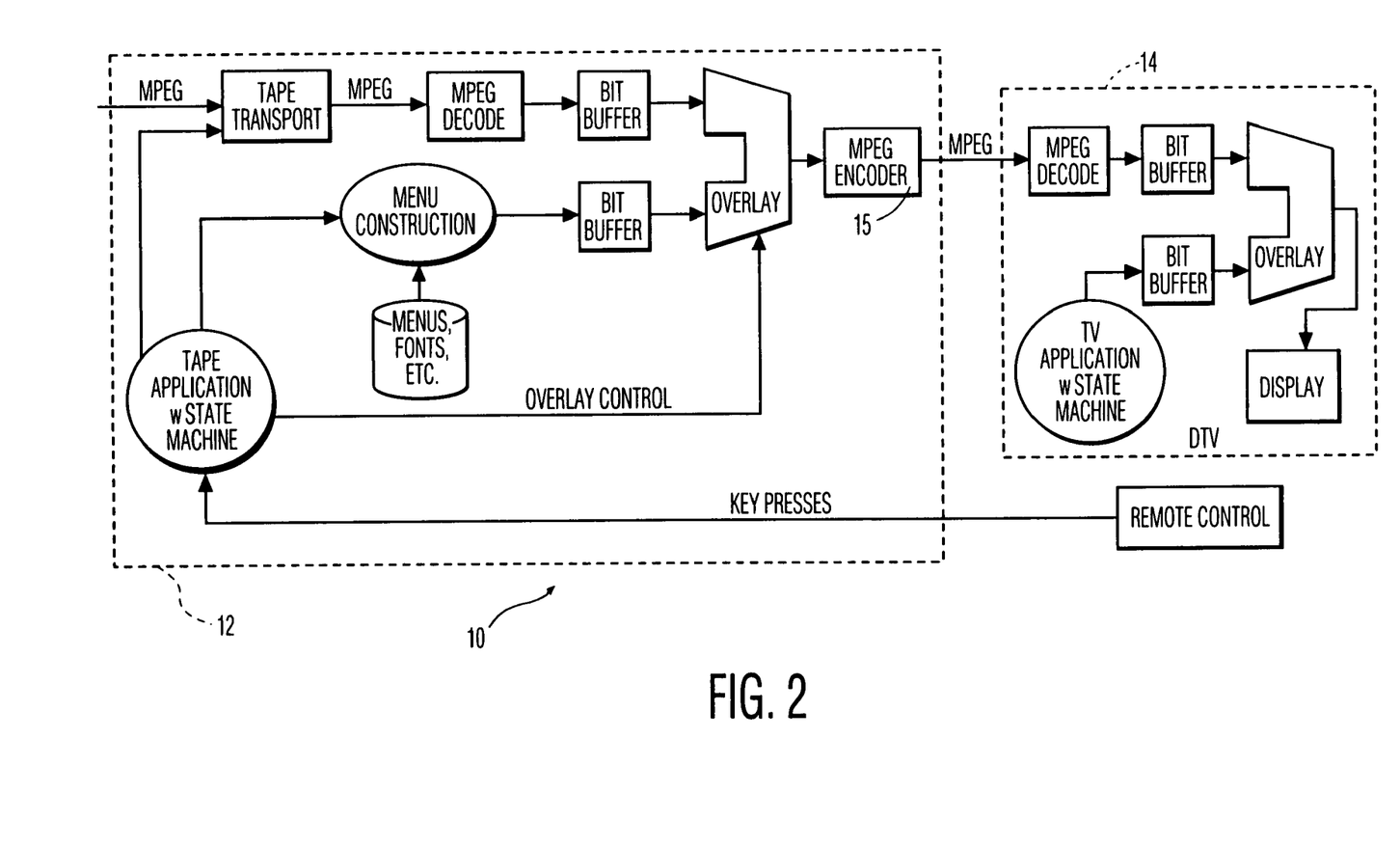
FIG. 2 shows, in simplified block-diagram form, the interoperability of a digital VCR and a digital television.

Unfortunately, to use the same approach (See FIG. 2) with a digital TV (DTV) as a display device 12 is not practical since it would require the menus to be transported as MPEG-2 transport streams. Generation of such streams necessitates integrating an MPEG encoder 15 into all peripheral devices which greatly increases the cost and complexity of such consumer electronic devices.

The present invention provides for exchanging on-screen display (OSD) menus and associated control between common consumer electronic (CE) devices interconnected via a digital serial bus. The serial bus is used for the physical and link layers; a control language for managing OSDs and controlling the connectivity of devices interconnected via the bus. Particularly, this invention provides for transferring bit-mapped OSDs which are created and controlled by the target device to a display device and combining the bit-mapped OSDs with a digital video stream received by the display device. In the preferred embodiment, the transfer of the bit-mapped OSD menu is managed by trigger messages sent from the target to the display device.

The present invention permits the selection of a target or source device (e.g., DVCR) for the display device (e.g., DTV), thereby allowing the target device to display both content and an OSD on the display device. Further, the user may select a source for the target device; this allows the chaining of devices so that for example, a program which is being decoded by a Cable STB may be viewed on a DTV and recorded on a DVHS recorder simultaneously.

Another aspect of the present invention involves remote navigation; that is the device that is being controlled keeps track of the user's navigation through the menu. For example, a VCR (i.e., target) makes its own changes to the OSD to move the highlight around with no participation from the display device (i.e., TV). This is accomplished utilizing OSD update blocks as described below.

BRIEF DESCRIPTION OF THE DRAWINGS

The invention may be better understood by referring to the enclosed drawing in which.

In the drawing, reference numerals that are identical in different figures indicate features that are the same or similar.

DETAILED DESCRIPTION OF THE DRAWINGS

The use of IEEE 1394 serial bus has been suggested for many applications within a Home Network environment. It is being discussed within Video Electronics Standards Association (VESA) for use as a "whole home network." It is being built into the next generation PCs and will be used for many local peripherals including disc drives. Further, digital audio/video consumer electronic devices such as digital televisions (DTVs) and digital video cassette recorders (DVHS) may utilize a serial bus for interconnecting these devices.

IEEE-1394 is a high speed, low cost digital serial bus developed for use as a peripheral or back-plane bus. Some of the highlights of the bus include: dynamic node address assignments, data rates of 100, 200, and 400 Mbits/sec, asynchronous and isochronous modes, fair bus arbitration, and consistency with ISO/IEC 13213. Co-pending application Ser. Nos. 09/508,869 and 09/508,922 discuss the use of IEEE-1394 serial bus for interoperability of audio/visual devices.

Transferring On Screen Display Menus (OSDs) from a target (i.e., device to be controlled) to a display device (e.g., DTV) can be achieved using one of several formats. For example, a subset of HTML without the navigation features may be used to describe the OSD. Another possibility is to transfer a run-length-encoded version of the menu using something similar to the DVD subpicture format. However, the preferred embodiment involves transferring the actual information in an OSD bit-map format. For example, an 8 bit/pixel, full screen, 640×480 OSD can be transferred in about 100 msecs utilizing 10% of the bandwidth of the 200 Mbit/sec IEEE 1394 serial bus.

A bit-map format for the OSD description allows (1) the manufacturer to maintain the "look and feel" of the OSD, (2) for freedom in the generation of the OSD and (3) for dynamic updates (i.e. partial screen or even single pixel updates are possible). Compared to compressed representations, the bit-map representation requires less processing time to display because displaying such bit-mapped OSD menus requires minimal interpretation and manipulation. Descriptive approaches, such as HTML, have a disadvantage of being difficult to specify and upgrade for typical consumer products.

To simplify the transfer of bit-mapped OSD information, a "Pull" method is preferably utilized. With this method, the bulk of the OSD data is transferred from the target or peripheral device to a display device by asynchronous read requests issued by the display device. That is, the display device reads the OSD information from the memory of the peripheral device by making use of at least one block read transaction of IEEE 1394. The display device is informed of the location and size of the OSD data via a "trigger" command which is sent from the peripheral device to the display device when the peripheral device is ready to begin transferring data.

Other alternatives for transferring an OSD menu from a peripheral device to a display device include; (1) an asynchronous push method which primarily uses IEEE 1394 asynchronous write transactions initiated by the peripheral device to write the OSD data into the display device, (2) an isochronous transport method for broadcasting the OSD data over one of the isochronous channels provided by IEEE 1394, (3) an asynchronous stream method for carrying the OSD information and (4) Alternately, the bit-mapped OSD could be provided via a 8 VSB-T (trellis) or 16 VSB RF remodulated channel.

Figure 3:
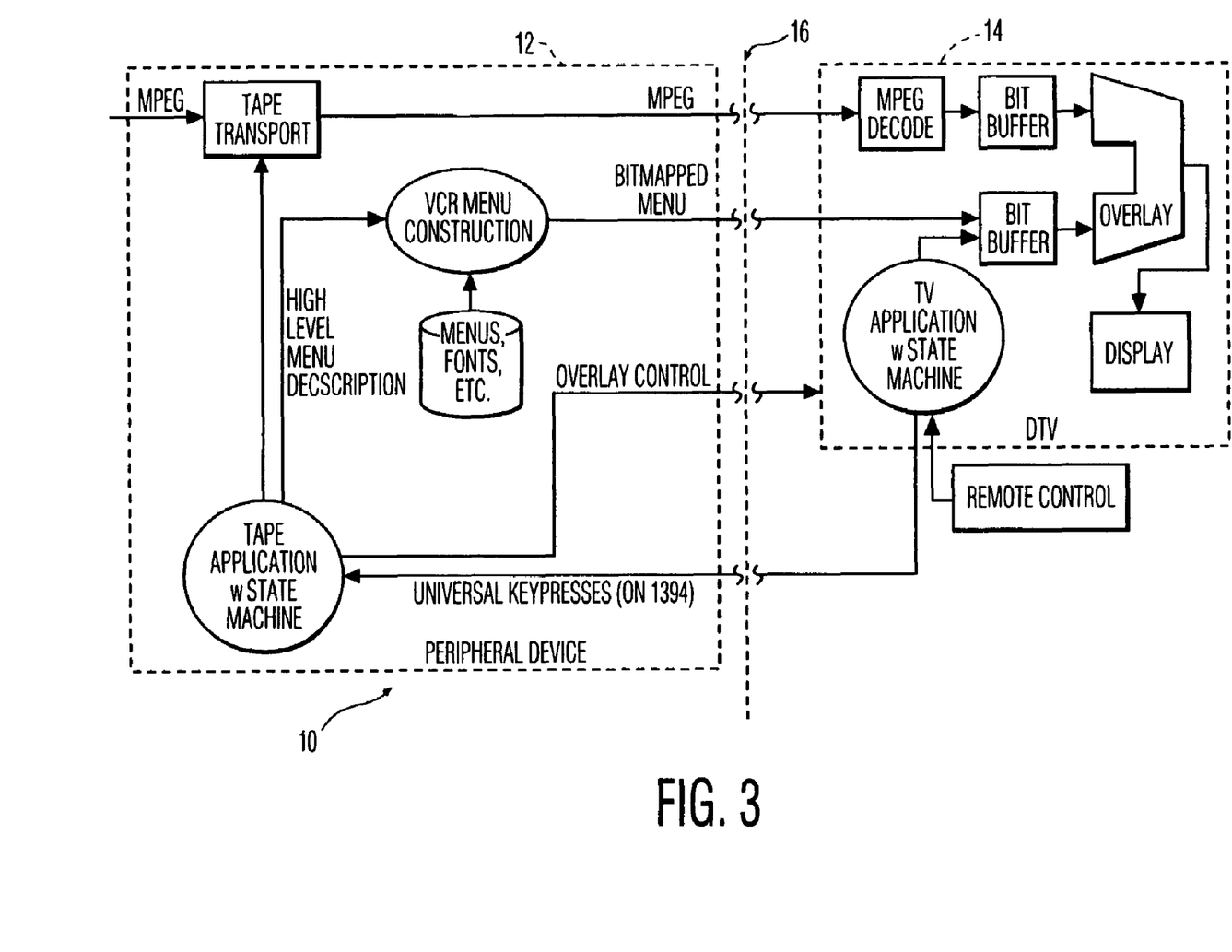
FIG. 3 shows, in simplified schematic block-diagram form, the interoperability of digital devices employing the present invention

FIG. 3 defines a system 10 for providing interoperability between digital A/V devices interconnected via an IEEE 1394 serial bus. In such a system 10, interoperability may be achieved by transferring the on-screen display (OSD) menu directly from the peripheral or target device 12 (e.g., DVCR) to display device 14 (e.g., DTV) utilizing the "Pull" method. The menu is not transferred as a composite video stream which would require first passing the menu information through a MPEG encoder contained in the peripheral device. The menu is transferred as a bit-mapped OSD via serial bus 16 to DTV 14 where the menu information may be overlayed in DTV 14 with the decoded MPEG stream prior to being displayed.

Many of the devices may use a registry table that is built during a discovery process which looks at information stored in each instrument's Self Describing Device Table (SDDT). The SDDT may contain such information as a unique ID, node address, etc. The registry tables would be used by the DTV to build a menu to allow the user to set up connections between components (similar to the user selecting the composite input for the source of their TV today). The target device first checks the display format and the largest available block fields within the Self Description Device Table (SDDT) to see what size and resolution OSD can be handled. It then constructs the OSD data (header and bit-map) and stores it in its OSD memory area.

Figure 4:
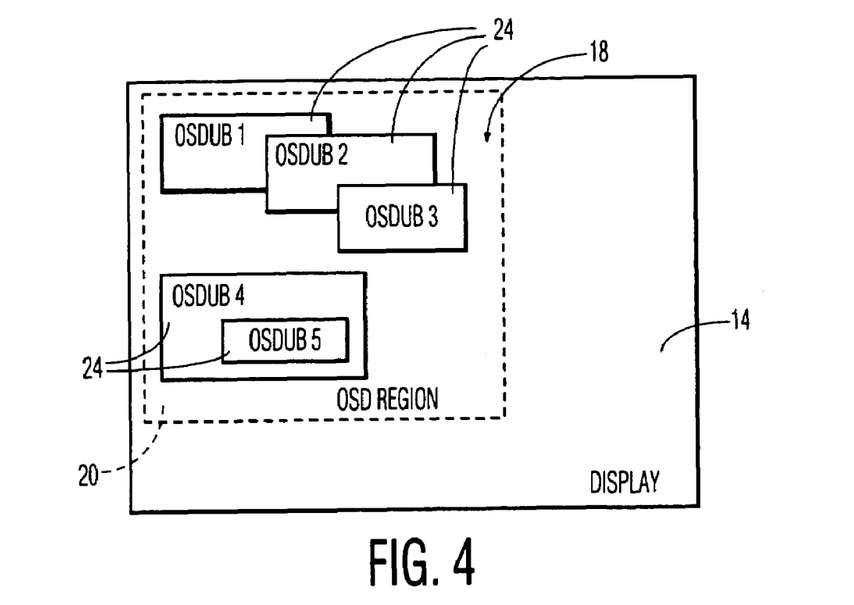
FIG. 4 shows, in simplified schematic block-diagram form, a display device having an on-screen display menu constructed using the present invention.

As shown in FIG. 4, an OSD menu 18 constructed on a display 14 consists of an OSD Region 20 and OSD Update Blocks 24 (OSDUB1 through OSDUB2). The data defining an OSD Region consists of a single color map contained in the Main OSD Header. Each OSD Update Block consists of an OSD Update Block Header and bit-map. The update blocks used to construct the OSD Menu are acquired from the target (e.g., VCR) by the display device to be used in constructing the OSD. The OSD Update Blocks are transferred from the target to the display device over the serial bus.

Figure 5:
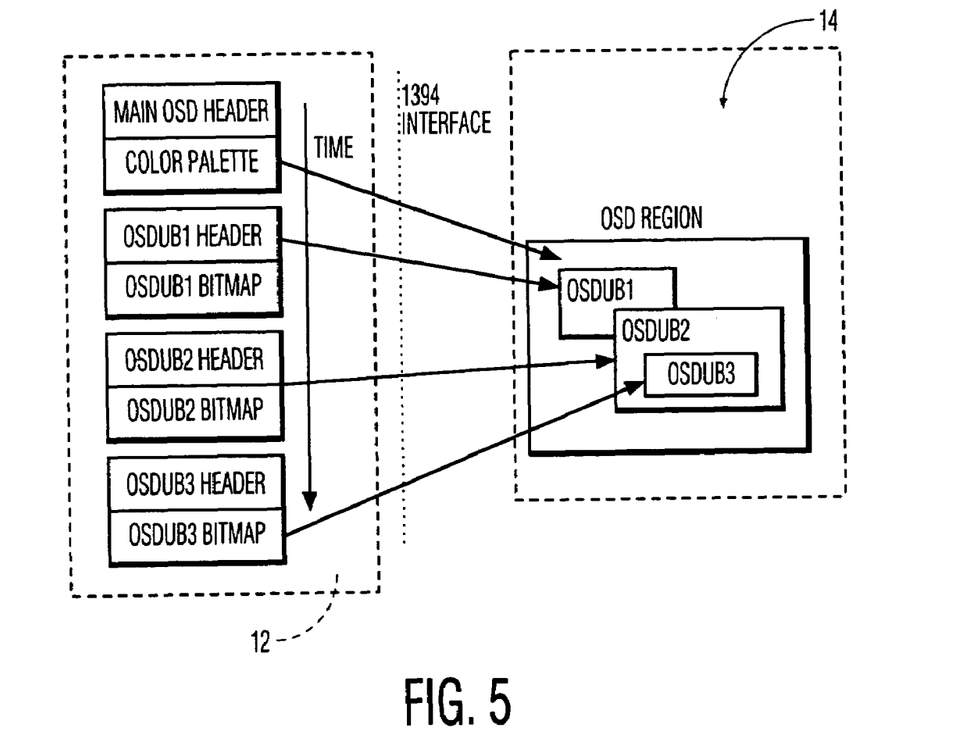
FIG. 5 shows, in simplified schematic form, the display device's construction of the on-screen display menu of FIG. 4.

Once the OSD information is ready for transfer, the target sends a trigger message to the display device (see FIG. 5). These same trigger messages are used for both the main OSD Header as well as the OSD Update blocks 24. A unique trigger message is needed for each OSD Update Block 24. Initiation of an OSD Update Block transfer can only occur through the use of a trigger message from a target to the display device. A queue may be implemented in the display device so that trigger messages are processed in the same order in which they are received.

The trigger messages 22 will be processed in the order in which they are sent out, so it is important for the target to know which OSD Update Block belongs on the bottom and which one belongs on the top. For example, a trigger message for OSD Block 0 (the Main OSD Header and Palette) is sent out first, followed by the trigger message for OSD Block 1, etc. Effectively, the first update block ends up on the bottom and the last update block on the top. (That is, an OSD Menu may be constructed in steps where each subsequent step may overwrite a portion of a previous step.) This allows for OSD blocks to be constructed on the fly thereby keeping memory requirements low.

The bit map immediately follows the header for each OSD block. The OSD pixels that are stored in memory are a 4:4:4 representation of chroma/luma levels set from palettes. Each palette entry contains a transparency (T) bit, a blending (B) bit, 6 bits of Y, 4 bits of Cb, and 4 bits of Cr. The transparency bit and the blending bit for each entry allow the target to selectively display either an OSD pixel, a video pixel, or a blended pixel on a pixel and pixel basis.

After a trigger message is received from the target, the OSD module in the display device requests memory accesses (i.e., asynchronous reads) starting at the memory location specified in the trigger message. If the OSD is entirely new, the first trigger message should refer to the Main OSD Header and Palette. Once the display device has this information, it then requests information specified in the second trigger message (i.e., OSD Update Block 1). The display device reads all of the information associated with OSD Block 1 and begins to construct the actual bit-map image. At the same time, it informs the target that the block has been read so that the target may free up any memory it had allocated to the transfer of this data block. This image is then displayed. If additional trigger messages have been received, then those OSD Update Blocks are processed in the same way. The display device's OSD controller (not shown) uses this data to construct the OSD and mix it with the decoded MPEG video in DTV 14. The OSD Update Blocks stay on the screen until they are overwritten, cleared, or the user selects a different device.

Before a color component is displayed, it is "left justified" by the OSD Controller (i.e., the least significant bits being padded with zeros) to produce 8 bits each of Y, Cb, and Cr.

The 4:4:4 representations will be muxed into 4:2:2 MPEG video output by the display controller internal to the display device.

After receiving the pixel data for block 1, the OSD module reads the header for block 2, obtains the necessary information and then reads the pixel data associated with block 2. The OSD module repeats this process (read header, request data using the address, get pixel data, etc.) up through the point that the DTV selects a different source. This data is then stored in the proper format internal to the display device. The Display device's OSD controller uses this data to construct the OSD and mix it with the decoded MPEG video.

Updates occur in exactly the same way that the original OSD is built with the exception that there would be no need to transfer the Main OSD Header and color palette unless the color palette or spatial resolution has changed. Based on the input from a remote control (directly or indirectly), the target constructs the desired OSD Update Block(s) in its memory. These blocks may be very small and will likely overlap with the OSD already being displayed. Once the block(s) are ready, the target sends out the appropriate trigger message(s). After the trigger message(s) is received from the target, the OSD module in the display device requests memory accesses starting at the memory location specified in the trigger message. These OSD Update Blocks are processed and overlaid over the existing OSD in the same order that the trigger messages were received. The display device again informs the target of a successful read so that the target can free up any internal memory that it has allocated to the block transfer. Exactly like the original OSD, these blocks stay on the display until overwritten.

Various views may be constructed within the target and then properly displayed by the display device. When a change is made, the target determines how the displayed OSD is affected and sends the proper Update Blocks to the display device. This scheme reduces complexity and bus traffic compared to the display device being required to keep track of overlays.

The amount of data to be transferred can be reduced by using a limited number of colors, using vertical line doubling and horizontal half resolution. For example, a 320×240 OSD can be displayed in 640×480 by specifying vertical line doubling and horizontal half resolution. If only 4 bit color is used, then the amount of data that needs to be transferred is approximately 39 Kbytes. Assuming a 512 byte payload every 500 usec, this OSD could be transferred in about 40 msec. Small updates would of course take much less time.

Real-time encoded video may be achieved by transferring bit-mapped OSD menus. In this case, a 640×480 display using 8 bit color could be transferred at 30 frames/second using a 74 Mbit/second Isochronous channel. Probably one such channel could be supported on the cluster.

In addition to the starting location and size of the current OSD data to be transferred to a display device, a field indicating the type of the OSD data may be useful. For example, a user watching a movie may want to ignore status or error messages. The differentiation of the type of OSD data is helpful for the display device and/or user to decide whether the message should be displayed.

The trigger message can also be used to inform the display device to read the Main OSD Header and color palette. Additionally, the trigger message will also be able to inform the display device to clear the OSD. Initiation of an OSD Update Block read can only occur through the use of a trigger message from a target to the display device. The display device should display pages in the same order as received.

Figure 6:
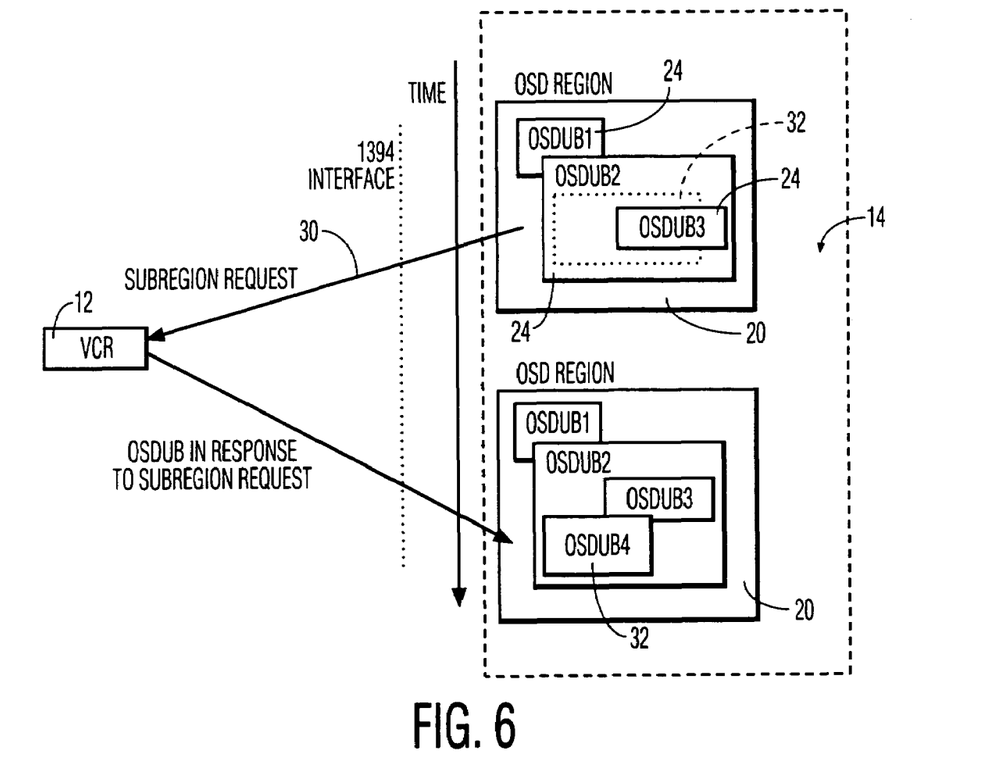
FIG. 6 shows, in simplified schematic form, the modification of the on-screen menu of FIG. 4.

FIG. 6 illustrates the use of a sub-region message 30 generated by the display device 14 for requesting the update of a specific sub-region 32 of the existing OSD Region 20 being displayed. This message may be useful in several situations such as when an error message from the display device or from some other device overwrites a portion of the existing OSD. The display device can request that this sub-region of the OSD be re-transmitted. Such a sub-region message would be useful when there is a change to the color map, but the display device did not save copies of the original OSD Update Bitmaps. Still another benefit of using a sub-region message would be when the user selects a different device and then comes back to the earlier device. The display device may need to request some information to rebuild the display. Although a sub-region is requested as a block, it is possible that the shape of the OSD which was previously within that sub-region is not rectangular in shape. For this reason, the target may transfer the information for this sub-region to the display device in multiple OSD Update Blocks. This message will include the row/column start coordinates and the width/height of the sub-region. Please note however, that the target does not need to wait for such a message to display an OSD. Most of the time, it will initiate changes to its OSD based on incoming remote control messages. Trigger messages will be used to initiate the transfer of the OSDUB in either case.

The OSD menu may be displayed properly over any of the below ATSC Video Formats.

| Picture Size | Frame Rate | | | | Aspect ratio | |
|---|---|---|---|---|---|---|
| 1920 × 1080 | 60i | — | 30p | 24p | 16:9 | — |
| 1280 × 720 | — | 60p | 30p | 24p | 16:9 | — |
| 704 × 480 | 60i | 60p | 30p | 24p | 16:9 | 4:3 |
| 640 × 480 | 60i | 60p | 30p | 24p | — | 4:3 | i = interlaced p= progressive

The general format of OSD menus being transferred from a target device to a display device involves first transferring a main OSD Header and secondly transferring a color palette. The OSD menu can be partially updated by transferring an updated OSD Header and the related bit-mapped menu. The Main OSD Header contains control information for the color map and general control information such as resolution, size of OSD area required, etc. The color map can be in one of 4 formats (2 bit color, 4 bit color, 8 bit color, no color map) and also includes facilities for blending with background video.

Main OSD Header

The main OSD header is used to set the format of the following OSD menu. For example, the following header contains information (i.e., size of 640×480 pixels) about the entire OSD Region and about the color palette. Changes to the Main OSD Header are communicated to the display device through the use of the trigger messages from the target. The defined OSD region is only valid as long as a target has been chosen as a source for a display device.

Main OSD Header Format

| 15 | 14 | 13 | 12 | 11 | 10 | 9 | 8 | 7 | 6 | 5 | 4 | 3 | 2 | 1 | 0 | |
|----|----|----|----|----|----|---|---|---|---|---|---|---|---|---|---|---|
| OSD Header Type | | | | | | | Vertical line doubling | Resolution Mode | | Mix Weight | | | | Color resolution | | 0 |
| | | | | | | | OSD Region Height | | | | | | | | | 1 |
| | | | | | | | OSD Region width | | | | | | | | | 2 |
| T0 | B0 | | color 0 Y | | | | | color 0 Cb | | | | color 0 Cr | | | | 3 |
| T1 | B1 | | color 1 Y | | | | | color 1 Cb | | | | color 1 Cr | | | | 4 |
| T2 | B2 | | color 2 Y | | | | | color 2 Cb | | | | color 2 Cr | | | | 5 |
| T3 | B3 | | color 3 Y | | | | | color 3 Cb | | | | color 3 Cr | | | | 6 |
| T4 | B4 | | color 4 Y | | | | | color 4 Cb | | | | color 4 Cr | | | | 7 |
| T5 | B5 | | color 5 Y | | | | | color 5 Cb | | | | color 5 Cr | | | | 8 |
| T6 | B6 | | color 6 Y | | | | | color 6 Cb | | | | color 6 Cr | | | | 9 |
| T7 | B7 | | color 7 Y | | | | | color 7 Cb | | | | color 7 Cr | | | | 10 |
| T8 | B8 | | color 8 Y | | | | | color8 Cb | | | | color 8 Cr | | | | 11 |
| T9 | B9 | | color 9 Y | | | | | color 9 Cb | | | | color 9 Cr | | | | 12 |
| T10 | B10 | | color 10 Y | | | | | color 10 Cb | | | | color 10 Cr | | | | 13 |
| T11 | B11 | | color 11 Y | | | | | color 11 Cb | | | | color 11 Cr | | | | 14 |
| T12 | B12 | | color 12 Y | | | | | color 12 Cb | | | | color 12 Cr | | | | 15 |
| T13 | B13 | | color 13 Y | | | | | color 13 Cb | | | | color 13 Cr | | | | 16 |
| T14 | B14 | | color 14 Y | | | | | color 14 Cb | | | | color 14 Cr | | | | 17 |
| T15 | B15 | | color 15 Y | | | | | color 15 Cb | | | | color 15 Cr | | | | 18 |

The OSD Header field is used to distinguish the type of OSD Block which is being transferred from the target to the display device for example, Main OSD Header or Bit-map Update Block.

There is also the possibility to specify that each vertical line is doubled. For an interlaced display, this has the effect of specifying that even and odd fields be the same. When this mode is enabled, every line of the OSD is repeated once (i.e., duplicated). For example, by setting the vertical enable bit to true and sending 5 lines of OSD data to the display device, the OSD would produce 10 lines on the display output. It is necessary, then, for the target to set the Block Height to correctly correspond to the total displayed OSD lines (in this case, 10).

The mix weight bits tell the OSD the blending ratio for OSD and video. For example, each bit may have a resolution of 1/16. The blending ratio ranges from 0 (transparent) to 15/16 (pixel almost solid). The same mix weight is used for all pixels that have their respective blending bit set (B[n]=1). The mix weight is ignored for palettes with blending disabled, resulting in solid OSD.

The OSD Region Height and OSD Region Width define the height and width of the OSD Region (in number of pixels) which the target plans to use. A typical region may be 640×480. The display device may not display portions of OSD Update Blocks which fall outside of this region. Color Resolution bits defines the current resolution of the OSD as, for example, full, half, or third resolution. The combination of the OSD Region Height, OSD Region Width and Color Resolution effectively set the OSD layout.

The color palette immediately follows the Main OSD Header. Each palette entry contains a transparency (T) bit, a blending (B) bit, 6 bits of Y, 4 bits of Cb, and 4 bits of Cr. Note that each of these 3 color components will be converted to a byte before mixing with MPEG video. Therefore, the bits associated with each field (e.g., Y) can be considered the most significant bits within that byte. For example, for luminance (Y), the 6 bits in the color map are the 6 most significant bits in a luminance byte. The transparency bit and the blending bit for each entry allow the target to selectively display either an OSD pixel, a video pixel, or a blended pixel on a pixel by pixel basis. Changes to the Color Palette are communicated to the display device through the use of trigger messages and subsequent read operations.

The OSD pixels that are stored in memory are a 4:4:4 representation of chroma/luma levels set from the palette. The values in the bit-map are essentially indexed into the palette. Note that the color resolution of each block may be less than that specified for the palette. For example, if there are 256 entries in the color map (i.e., 8 bits/pixel), then a specific OSD block may specify 2 bits/pixel, 4 bits/pixel, or 8 bits/pixel. If 2 bits/pixel are specified for the OSD block in this example, then these 2 bits would index into the first 4 entries of the color map. If 4 bits/pixel are specified for the OSD block, then these 4 bits would index into the first 16 entries of the color map.

For the True Color Mode, the OSD hardware in the display device may extracts 4:2:2 data directly from the OSD FIFO (not shown), and send it out through the outputs, by-passing the normal palette look-up. All normal functions of the OSD are supported, except for the mixing function. Thus, the user may use this True Color mode in full, half, or third resolutions. Any pixel can be made transparent by setting its Y component to "0". Note that all data for the header block is assumed to be in 4:2:2 format in the following sequence: Y1, Cb1, Cr1, Y2, Y3, Cb3, Cr3, Y4, . . . Each component is 8 bits of data. In this format, both Y1 and Y2 use the same Chroma components (Cb1, Cr1). That is, each pixel is represented by a respective luma value and by a set of chroma information that is shared with a second pixel. For example, pixels 1 and 2 are represented by respective luma values Y1 and Y2 and a common set of chroma values Cb1 and Cr1. This results in an effective pixel size of 16 bits/pixel. As in palette-based mode, only even numbers of pixels are supported for OSD Update Blocks. The pixel format of the update block may be configured such that the upper left pixel is first, followed in a logical manner across first and down second to the final pixel located at the bottom right of the region. Again, the user needs to properly calculate the number of pixels per line required for the given resolution and line width.

| True Color Bit-map Format | | | |
| --- | --- | --- | --- |
| pixel 1 - Y | pixel 0&1 - Cr | pixel 0&1 - Cb | pixel 0 - Y |
| pixel 3 - Y | pixel 2&3 - Cr | pixel 2&3 - Cb | pixel 2 - Y |
| Etc. | | | |

Figure 7:
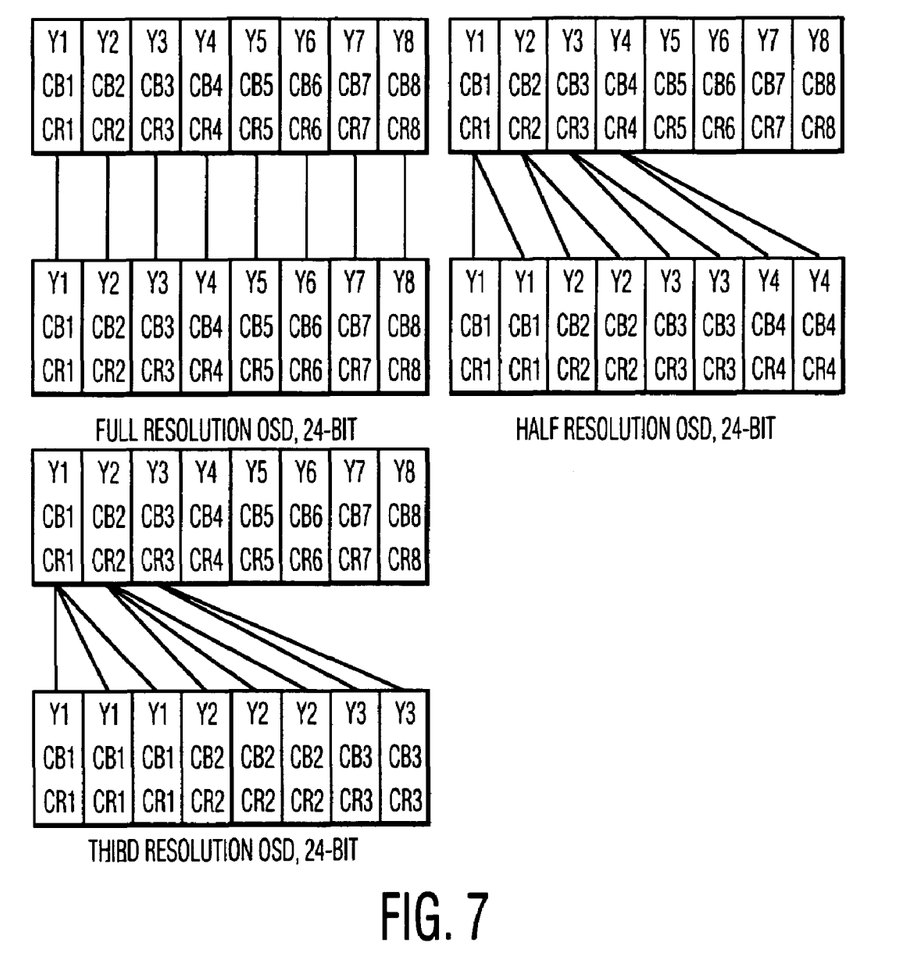
FIG. 7 shows, in simplified schematic block diagram form, the pixel mapping for different resolutions of on-screen display menus of the present invention.

High resolution displays can have 4 to 6 times the pixel density for the same size OSD area. To ease setup requirements and OSD transmission times, half resolution and one-third resolution modes are provided. These modes are available for both palette based OSD and true-color OSD. FIG. 7 illustrates how individual pixels may be mapped to output pixels based upon the selected resolution. It is important to realize that it is up to the target to properly set the width of the OSD Region based upon the resolution mode. The starting column and width in the OSD Update Block Header directly correspond to output display pixels of the display device (based upon the internal display pixel counter). For example, if the column start position is 100 and the width is 100, then the OSD Update will begin displaying pixels at pixel count 100 and end at pixel count 199. Thus, this function is not dependent upon the resolution mode selected. If the resolution is Half, and the target wants to display this same set of pixels, then it would have to adjust the width to 200. The effect would be to see a horizontally "stretched" version of the original OSD picture.

At a minimum, all display devices should be able to display a 640×480 at 2 bits/pixel OSD using vertical line doubling and ½ or ⅓ resolution mode for horizontal. For ⅓ horizontal mode, this would result in a 1920×1080 display with the resolution (and data transfer time) of a 640×480 display.

The transfer of data (i.e., bit-mapped menus) through the bus may be achieved in a reasonable amount of time. For example all the data required for a 640×480 OSD with 4 bits/pixel requires 1,228,800 bits. All of this data can be transferred in about 150 ms assuming a 100 Mb/sec bus, a packet payload of 512 Bytes and assuming that we can transmit one packet each 500 μsec. This time goes down even further when one takes into account that no OSD takes up this much space. Using only a quarter (typical) of the entire screen results in roughly 40 ms transfer time. Small updates can be on the order of a few milliseconds.

OSD Update Blocks

An OSD Region is a defined area on the display screen. The region is filled using OSD Update Blocks (OSDUB) (See FIG. 4). Each OSD Update Block defines a rectangular portion of the screen to be updated. Each block contains its own header information and bit-map. Each update block will remain on the screen until overwritten by another block or until a "Clear Region" trigger command is received. The target has full flexibility of the format of these blocks (taking into account the limitations of the display device).

The OSD Update Block's dimensions are absolute (in a pixel sense). Its coordinates are absolute within the OSD Region. The upper left hand corner of the OSD region is coordinate (0,0). The height/width of the displayed OSD Block will depend on the display format. If the transmission format changes, the OSD's appearance may change accordingly. If the transmission format changes, a message will be provided (see below discussion under Display Information) from the display device to the target letting the target know that the format has changed, allowing the target to re-specify the OSD if it desires. It is anticipated, that most OSDs will be mixed with the display format and will be unaffected by a transmission format change. However, the target may still want to redraw the OSD since the video may be occupying a different portion of the screen.

The header for an OSD Update Block contains the start position within the OSD Region and the size of the block. The header (see below) contains two bits which designate the color resolution. This color resolution must be less than or equal to that specified in the Main OSD Header.

OSD Update Block Header Format

| 15 | 14 | 13 | 12 | 11 | 10 | 9 | 8 | 7 | 6 | 5 | 4 | 3 | 2 | 1 | 0 | |
|----|----|----|----|----|----|---|---|---|---|---|---|---|---|---|---|---|
| OSD Header Type | | | | | row start position | | | | | | | | | | | 0 |
| | | | | | block height | | | | | | | | | | | 1 |
| | | | | | column start position | | | | | | | | | | | 2 |
| | | | | | block width | | | | | | | | | | | 3 |
| 9 bit Shift Value | | | | | | | | | Shift | Shift Direction | | Single Color | Color Resolution | | | 4 |
| | | | | | Bit-map Information | | | | | | | | | | | etc |

The row start and the column start pointers define the upper left corner of the OSD Block which will be displayed. Outside of this box, no OSD will be displayed. Note that pixels are numbered in increasing order starting at 0.

The block height and block width define the height and width of the OSD Block (in number of pixels) which will be displayed. Outside of this box, no OSD will be displayed.

A method for sending a single color update block has been provided. When single color is specified, only a single color is sent in the Update Block (as opposed to a bit-map of the specified region). The color is supplied in the format implied by the header. The Single Color (SC) bit when set specifies that the entire OSD Update Block is a single color. In this case, the bit-map information will contain one color in the format specified by the Color Resolution bits.

An Update Block can be used to shift pixels in the specified region up, down, right, or left. The data to be shifted in is supplied in the bit-map portion of the Update Block. For example, if a 200×100 region is specified by the Update Block, and shift right by 10 pixels is specified, then the bit-map supplied with the Update Block would be 10x100. A two bit field specifies the shift direction.

When asserted, the Shift bit specifies that the region specified by this Update Block be shifted in this specified direction by the specified number of pixels. The data that is to be shifted in is contained in the bit-map data portion of the Update Block.

When the shift bit is set, this 9 bit shift value field specifies the number of pixels by which the data is shifted. The size of the bit-map included in the Update Block is a function of this field and the dimension perpendicular to the shift direction.

Sub-Region Request

A sub-region message 30 has also been defined which allows the display device 14 to request a specific portion 32 of a region 20 which had been previously sent (see FIG. 6). This would be useful if the OSD had to be temporarily overwritten for an error message from a different device or something similar. In this way, the display device can request the region when needed (again keeping memory requirements low).

OSD Sub-region Request Message Encapsulation

| ←---- 1 Byte ----→ | ←----1 Byte----→ | ←---- 1 Byte ----→ | ←---- 1 Byte ----→ |
|---|---|---|---|
| FCP CTS = 1h | APDU = E0h | Context ID = 90h??? | Object ID = 03h??? |
| Method ID = 46h | IV ID = 6Ch | Delimiter = F5h | Delimiter = F5h |
| Data start = F4h | Data length = 38h | Escape = F6h | OSD_sub-region_request |
| OSD_sub-region_request | | | |
| OSD_sub-region_request | | | End of Command = F9h |

←———— 1 Quadlet ————→

The field "OSD_sub-region_request" consists of the following information:

TABLE 1

OSD Trigger Message Format

| SR Row | SR Column | SR Height | SR Width |
|---|---|---|---|
| 2 Bytes | 2 Bytes | 2 Byte | 2 Bytes |

SR_Row: Number of row from the top (top row being 0 relative to the top of the Region requested by the target for OSD usage).

SR_Column: Number of column from the left (left column being 0 relative to the left of the Region requested by the target for OSD usage).

SR_Height: Height of Subregion in number of rows (Must be less than the number of rows in the OSD Region).

SR_Width: Width of Subregion in number of columns (Must be less than the number of columns in the OSD Region).

If SR_Height=SR_Width=0, then the request shall be interpreted as a request to resend the Main OSD Header and the color map.

All targets capable of generating an OSD shall implement an OSD Sub-region Object as defined below. Display devices communicate the applicable sub-region by specifying the row/column coordinates of the upper left corner of the region and the width and height. The message syntax which goes into a FCP frame as defined by IEC 61883 is shown below.

Display Information

The following message has been defined to allow the display device to inform the target that the display format has changed. The display format (along with other information) will also be available to be read by the target at any time. The feedback provided from the display device to the target may consist of what the entire OSD bit-map plane is (usually the same as the display format) and what portion of the plane has overlapping video. For example, the OSD bit-map plane may be 1920×1080, but if the incoming video is 640×480 with a 4:3 aspect ratio, then the resultant video may be displayed as 1280×960 with the upper left hand corner of the video at coordinate (319,59).

structure of common parts or functions. CAL and AV/C are control languages that distinguish between logical and physical entities. For example, a television (i.e., a physical entity) may have a number of functional components (i.e., logical entities) such as a tuner, audio amplifier, etc. Such control languages provide two main functions: Resource allocation and Control. Resource allocation is concerned with requesting, using and releasing Generic Network resources. Messages and control are transported by the FCP as defined in IEC-61883 and discussed above. For example, CAL has adopted an object base methodology for its command syntax. An object contains and has sole access to a set number of internal values known as instance variables (IV). Each object keeps an internal list of methods. A method is an action that an object takes as a result of receiving a message. When a method is invoked, one or more IVs are usually updated. A message may consist of a method identifier followed by zero or more parameters. When an object receives a method, it looks through its list of methods for one which matches the method identified in the message. If found, the method will be executed. The parameters supplied with the message determine the exact execution of the method.

Application Control Language

In order for a consumer electronic device to interact with other devices interconnected via a IEEE 1394 serial bus, a common set of commands must be defined. Three standard approaches for device modeling and control are CAL, AV/C and the approach adopted for the Universal Serial Bus (USB).

The design of control languages is based on the assumption that all consumer electronic products have a hierarchical All devices that are capable of displaying OSDs must implement the following OSD object. This object assumes Asynchronous PULL with trigger message approach. This object would be carried in the trigger message from the target to the display device. The display device would then pull the menu by reading it from the target's bus mapped memory space. The response of this request will be used by the target device as an indication that the display device has read these update blocks.

| OSD Update Trigger Object 2 | | | | |
|---|---|---|---|---|
| OSD Update Trigger Object | | | (16) Data Memory | |
| The object is used for triggering the OSD mechanism in display capable devices. | | | | |
| IV | R/W | Type | Name | Context Function |
| a (61) | R | Numeric | size_of_block | size of "memory_block" in bytes (default value = 10) |
| b (62) | R | Numeric | length_of_record | length of current_record in bytes (default value = 10) |
| C (43) | R/W | Numeric | current_index | current record block pointed to (default value = 0) |
| l (6C) | R/W | Data ( ) | memory_block | In each record, 6 MSBs contain the offset and LSB contains the OSD_type, remaining 3 bytes represent the length of OSD in bytes. |

All devices capable of generating the OSD must implement the following OSD Subregion Request Object. This object would be carried in the request message from the display device to the target for requesting a sub-region of the OSD with coordinates row and column, width and height.

| OSD Subregion Request Object 3 | | | | |
|---|---|---|---|---|
| OSD Sub-region Request Object | | | (16) Data Memory | |
| The object is used for requesting a sub-region of the OSD. | | | | |
| IV | R/W | Type | Name | Context Function |
| a (61) | R | Numeric | size_of_block | size of "memory_block" in bytes (default value = 8) |
| b (62) | R | Numeric | length_of_record | length of current_record in bytes (default value = 8) |
| C (43) | R/W | Numeric | current_index | current record block pointed to (default value = 0) |
| l (6C) | R/W | Data (8) | memory_block | In each record, 2 MSBs contain the row coordinate, next two bytes the column coordinate, next two bytes the height and 2 LSBs the width of the sub-region. |

The following object is used for informing the target about the display. For example, the resolution and size of the OSD bit-map plane, and the location and size of the displayed video.

| Display Information Object 4 | | | | |
|---|---|---|---|---|
| Display Information Object | | | (16) Data Memory | |
| The object is used for informing the Target of the OSD and Display Format. | | | | |
| IV | R/W | Type | Name | Context Function |
| a (61) | R | Numeric | size_of_block | size of "memory_block" in bytes (default value = 16) |
| b (62) | R | Numeric | length_of_record | length of current_record in bytes (default value = 16) |
| C (43) | R/W | Numeric | current_index | current record block pointed to (default value = 0) |
| 1 (6C) | R/W | Data (16) | memory_block | In each record, 4 MSBs contain the full screen bit-map dimensions, the next 4 bytes contain the OSD Region's location, the next 4 bytes contain the size of the displayed video, the last 4 bytes contain the location of the displayed video. |

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims.

The invention claimed is:

1. A digital apparatus comprising:
   (a) means for receiving from a peripheral device, interconnected by a digital bus, bit-mapped data representative of an on-screen display generated and controlled by said peripheral device;
   (b) means for receiving a digital stream representative of a video program;
   (c) means for combining, in said digital apparatus, said bit-mapped data received from said peripheral device and said digital stream to produce a signal representative of a combined displayable image, a portion of which is overwritten;
   (d) means for receiving subsequent bit-mapped data representative of an updated portion of the previously received data;
   (e) means for updating said combined displayable image with said received subsequent bit-mapped data to produce an updated combined displayable image, said updated combined displayable image being generated and controlled by said peripheral device;
   (f) means for requesting from said peripheral device said bit-mapped data corresponding to said overwritten portion of said combined displayable image;
   (g) means for receiving from said peripheral device said bit-mapped data; and
   (h) means for selecting said peripheral device from a plurality of available peripheral devices interconnected by said digital bus.

2. The digital apparatus of claim 1 further comprising:
means for notifying said peripheral device of a format change in said display device in response to a format change of said received digital stream.

3. The digital apparatus of claim 2 further comprising:
means for shifting said bit-mapped data within said combined displayable image.

4. A digital apparatus comprising:
   (a) means for receiving from a peripheral device, interconnected by a digital IEEE 1394 compliant bus, bit-mapped data representative of an on-screen display generated and controlled by said peripheral device;

(b) means for receiving a digital stream representative of a video program; and (c) means for combining, in said digital apparatus, said bit-mapped data received from said peripheral device and said digital stream to produce a signal representative of a combined displayable image, wherein said means for receiving data representative of said on-screen display comprises means for receiving data using an asynchronous mode of transfer.

5. A method for managing an on-screen display menu of a peripheral device interconnected to a display device via a digital bus, the display device performing the steps of:

(a) receiving, from said peripheral device, a message indicative of the characteristics of a block of bit-mapped data stored in a memory device generated by said peripheral device, said bit-mapped data being generated by an on-screen display menu of said peripheral device;

(b) generating and providing asynchronous read request command to said peripheral device;

(c) receiving, in response to said asynchronous read request command, said bit-mapped data from said peripheral device;

(d) receiving a digital stream representative of a video program; and (e) combining said bit-mapped data received from said peripheral device and said digital stream to produce a combined displayable image, said combined image being representative of said on-screen display generated by said peripheral device.

6. The method of claim 5 wherein said message contains the location and size of said block of bit-mapped data stored in said memory device.

7. The method of claim 6 wherein said data comprises a header and a bit-mapped update block, said header defining the parameters of said on-screen display menu and said bit-mapped update block defining the location and content of said menu.

8. The method of claim 5 wherein said digital bus comprises an IEEE 1394 compliant bus and in that a first data transfer mode comprises an asynchronous mode.

9. A digital television apparatus, comprising:

(a) means for receiving from a peripheral device, interconnected by a digital bus, bit-mapped data representative of an on-screen display generated and controlled by said peripheral device;

(b) means for receiving from said peripheral device, interconnected by said digital bus, subsequent bit-mapped data representative of an updated portion of said previously transferred bit-mapped data, said subsequent bit-mapped data being indexed into said previously transferred bit-mapped data;

(c) means for combining, in said digital television, said bit-mapped data or said subsequent bit-mapped data with a received digital stream representative of a video program to generate a combined displayable image; and (d) means for receiving from said peripheral device data representative of a programmed event according to a first transfer mode; and wherein, (e) said means for receiving bit-mapped data comprises means for receiving bit-mapped data according to a second transfer mode.

10. A digital television apparatus, comprising:

(a) means for receiving from a peripheral device, interconnected by a digital IEEE 1394 compliant bus, bit-mapped data representative of an on-screen display generated and controlled by said peripheral device;

(b) means for receiving from said peripheral device, interconnected by said digital bus, subsequent bit-mapped data representative of an updated portion of said previously transferred bit-mapped data, said subsequent bit-mapped data being indexed into said previously transferred bit-mapped data:

(c) means for combining, in said digital television, said bit-mapped data, or said subsequent bit-mapped data, with a received digital stream representative of a video program to generate a combined displayable image;

(d) means for receiving, from said peripheral device, data representative of a programmed event according to an asynchronous transfer mode, wherein, (e) said means for receiving bit-mapped data comprises means for receiving bit-mapped data according to an isochronous transfer mode.

* * * * *